J. HARRIS.
VALVE.
APPLICATION FILED MAR. 15, 1915.
1,315,018. Patented Sept. 2, 1919.
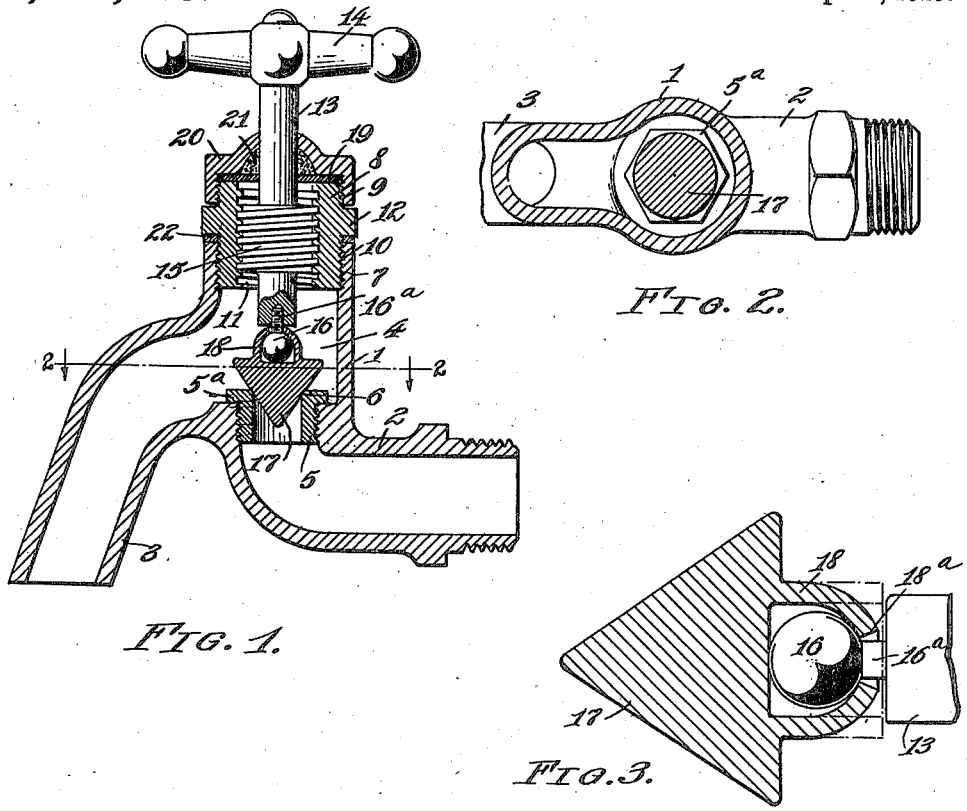
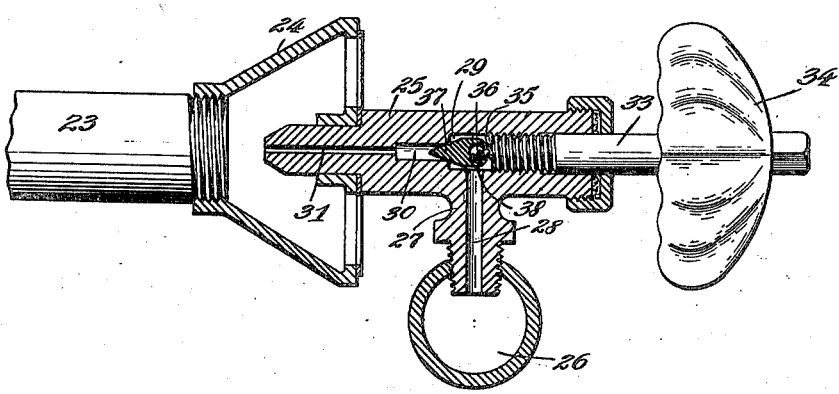
WITNESSES:
P. L. Bruck
H. Rusall.
INVENTOR,
John Harris,
By Hull & Smith
ATT'YS.

UNITED STATES PATENT OFFICE.

JOHN HARRIS, OF CLEVELAND, OHIO.

VALVE.

1,315,018.  Specification of Letters Patent.  Patented Sept. 2, 1919.

Continuation in part of application Serial No. 877,649, filed December 17, 1914. This application filed March 15, 1915. Serial No. 14,536.

*To all whom it may concern:*

Be it known that I, JOHN HARRIS, a citizen of the United States, residing at Cleveland, in the county of Cuyahoga and State of Ohio, have invented a certain new and useful Improvement in Valves, of which the following is a full, clear, and exact description, reference being had to the accompanying drawings.
This invention relates to valves, and more particularly to valves of the needle type. The general object of the invention is to provide a valve of this character which will automatically secure a proper contact between the needle point and the seat even though the stem should be neither perfectly concentric nor coaxial with that seat. Other objects are the provision of a valve which can be made cheaply and quickly, with a maximum of manufacturing tolerance; the provision of new and simplified guiding means; the provision of a noiseless packingless valve; while further and more limited objects of the invention will appear hereinafter.

Referring to the drawings forming part hereof, Figure 1 represents a central vertical sectional view taken through a faucet having my valve therein; Fig. 2 is a sectional detail corresponding to the line 2—2 of Fig. 1; Fig. 3 is an enlarged sectional view through the valve point and the coöperating part of the stem; Fig. 4 is a longitudinal sectional view taken through a gas stove valve and mixer, certain parts being shown in elevation.

Describing by reference characters the various parts illustrated herein and with particular reference to Figs. 1–3 inclusive 1 denotes the vertical portion of a faucet casting, 2 the inlet branch, and 3 the outlet branch projecting therefrom. The vertical branch 1 is provided with a chamber 4 which is adapted to communicate with the inlet branch 2 through a valve-controlled passage. The valve controlling said passage comprises a tubular seat 5 which may be threaded into the vertical bore connecting the interior of the branch 2 with the chamber 4. The valve seat is provided with a flange 5$^a$ which may be shaped as a nut to facilitate the application of the seat to and within the vertical bore. The valve seat is beveled, as shown at 6, the inclination being substantially the same as the inclination of the coöperating valve point, to be described hereinafter, but is very much narrower than the beveled portion of the valve point so as to afford nearly (but not quite) a line contact. The diameter of this seat is about midway between the greatest and smallest diameters of the point member.

At its upper end, the vertical branch 1 is provided with an internal thread 7 which is adapted to receive a bushing 8, said bushing being provided with an upper and a lower external thread, indicated at 9 and 10, respectively, the lower thread providing means whereby the bushing may be applied to the vertical body 1. The bushing is also provided with an internal thread 11 of coarse pitch for the reception of the valve stem (to be described hereinafter). Intermediate of the upper and lower external threads, the bushing is provided with a projecting flange 12 constituting a nut whereby it may be screwed into and out of the body 1.

13 denotes a valve stem having a removable operating handle 14 at the upper end thereof and provided with an intermediate enlarged threaded portion 15 whereby it is reciprocably mounted within the bushing 8. The lower end of the stem 13 carries my improved valve point. For the purpose of receiving such point, the lower end of the stem is provided with a spherical head 16 carried by a reduced stem 16$^a$ which is preferably threaded into the end of the valve stem and constitutes a reduced extension of the latter. This spherical head 16 provides a sort of universal joint connection with the valve point.

The valve point comprises a conical body 17 which is adapted to engage the tapered portion 6 of the seat, said body being provided with a tubular extension 18. Before the valve point is applied to the head 16, this tubular extension is of substantially cylindrical shape, as shown by the dotted lines in Fig. 3, the internal diameter of this extension being somewhat greater than the diameter of the head 16 and the length of such extension being such that, when spun or peened inwardly about the head, it will substantially engage the same, whereby there will be practically no lost motion or "play" in a longitudinal direction between the valve point and the stem. Lateral clearance is provided, not only between the sides of the extension 18 and the head 16, but between the contracted upper end of such extension and the reduced stem extension 16$^a$, as shown more particularly in Figs. 2 and 3.

The stem 13 may extend through a packing washer 19 and a gland nut 20, said nut being shown as threaded upon the upper threaded portion 9 of the bushing 8, and packing 21 may be inserted within the gland nut about the stem 13. The packing 22 will also preferably be inserted between the nut-flange projection 12 and the top of the body 1.

In Fig. 4 my invention is shown as applied to a gas stove valve. In this view, 23 denotes the mixer tube conducting a mixture of gas and air from the usual mixer bell 24. 25 denotes the casing for the gas valve, 26 the gas supply pipe into which the vertical branch 27 of the valve casing is threaded, in the usual manner. The vertical branch 27 is provided with a bore 28 whereby gas may be conducted to the chamber 29 formed in front of the valve stem. The chamber 29 is contracted at its front end, as shown at 30, to form an annular valve seat, and said chamber communicates with the mixer 24 through a bore 31, from which the bore 31 extends, said bore in turn being shown as communicating with the reduced bore 32 through which gas is discharged into the mixer. The chamber 29 is provided at the front end of a bore extending to the rear of the valve casing, said bore being threaded at the rear of said chamber for the reception of the valve stem 33, said valve stem being provided with the usual removable operating handle 34. The threaded front end of the valve stem 33 is provided with a reduced extension 35 having a rounded or spherical head 36 thereon, similar to the parts 15 and 16 of the preceding modifications. The valve point comprises a body 37 which is similar to the point or body 17 and which is adapted to coöperate with the seat 30. In this case, the tapered portion of the valve point merges with a cylindrical portion 38 which is extended a sufficient distance to enable it to be spun or peened inwardly and about the head 36 in the same manner as the extension 18 is contracted about the stem 16$^a$. The purpose of providing the cylindrical extension 38 is, while securing proper lateral play of the valve point upon its head 36, to also provide a bearing between the sides of the valve point and the walls of the chamber 29 and the rear threaded extension thereof, whereby the valve point cannot tilt sufficiently to cause it to drop downwardly within the chamber 29 or prevent it from entering the bore 31.

This application covers the form of valve disclosed in my application No. 877,649, filed Dec. 17, 1914, now matured into Patent No. 1,217,119, and is, in some respects, a continuation of such application.

Having thus described my invention, what I claim is:—

1. A valve of the character described comprising a stem member and a valve point member, one of said members having a rounded head and a neck connecting said head with the main body of the member, said other member having a recessed end receiving the rounded head therewithin and contracted about such head, the valve point member having a conical portion adapted to enter the seat and a substantially cylindrical portion which is adapted to engage the wall of the valve casing, before the smaller end of said valve point member is moved entirely out of register with the seat.

2. In a valve of the character described, in combination, a seat having a narrow circular engaging portion, a stem having a rounded head and a reduced portion connecting said head and the body of the stem, and a valve point having a recessed end adapted to receive the rounded head therewithin and having the walls of said recessed end contracted to a smaller diameter than the diameter of the head whereby the valve point will be retained upon the head but will be permitted to oscillate or play with respect to said stem, the diameter of the seating portion of said valve point ranging from an amount much less than that of the seat to an amount much greater than that of the seat.

3. In a valve, a body having a passageway, a seat in said passageway, a stem substantially coaxial with said seat, and a valve member having a universal connection with said stem, said member having a portion adapted when the valve is open to engage the wall of said passageway and also having a tapering portion adapted when the valve is closed to engage said seat, the distance of the wall from said wall engaging portion in the closed position of the valve being less than the distance of the tip end of the tapering portion from a line parallel to the stem and passing through an edge of the valve seat.

4. In a valve, a body having a seat therein and a guiding portion adjacent and substantially perpendicular to said seat, a stem and a valve member articulated to said stem, and having a tapering end adapted to enter said seat, the difference between the least and greatest diameters of said tapered end being not less than the distance of said guiding portion from the edge of said seat.

In testimony whereof I hereunto affix my signature in the presence of two witnesses.

JOHN HARRIS.

Witnesses:
  J. B. HULL,
  BRENNAN B. WEST.